United States Patent
Daoud

[19]

[11] Patent Number: 6,076,309

[45] Date of Patent: Jun. 20, 2000

[54] RETRACTABLE WEATHER SHIELD

[75] Inventor: Bassel Hage Daoud, Parsippany, N.J.

[73] Assignee: Lucent Technologies Inc., Murray Hill, N.J.

[21] Appl. No.: 09/105,331

[22] Filed: Jun. 25, 1998

[51] Int. Cl.⁷ .................................................. E04B 1/346
[52] U.S. Cl. ........................... 52/62; 312/205; 312/223.1; 312/246
[58] Field of Search ................ 52/67; 312/203, 312/223.1, 246

[56] References Cited

U.S. PATENT DOCUMENTS

| | | | |
|---|---|---|---|
| 3,067,813 | 12/1962 | Henatsch | 160/32 |
| 3,845,591 | 11/1974 | Stine | 52/67 |
| 4,522,246 | 6/1985 | Bierbrauer et al. | 160/223 |
| 4,635,699 | 1/1987 | Kauffman et al. | 160/211 |
| 4,784,429 | 11/1988 | Hodges | 296/165 |
| 4,925,258 | 5/1990 | Ludwig et al. | . |
| 5,156,195 | 10/1992 | Wehler et al. | 160/202 |
| 5,215,366 | 6/1993 | Givens | . |
| 5,399,010 | 3/1995 | McClung et al. | . |
| 5,645,333 | 7/1997 | Sakurai | . |

*Primary Examiner*—Christopher T. Kent
*Assistant Examiner*—Nkeisha J. Maddox

[57] ABSTRACT

A retractable weather shield for protecting an outdoor structure from the elements, comprising a base panel; a first telescoping panel slidably mounted and supported within the base panel, the first telescoping panel being stored substantially within the base panel when in a stored position and extending substantially outside the base panel when in a deployed position; mounting means for mounting the shield above the structure; and wherein the shield extends over the structure in a substantially perpendicular direction when the first telescoping panel is in the deployed position so as to protect the structure from the elements.

37 Claims, 8 Drawing Sheets

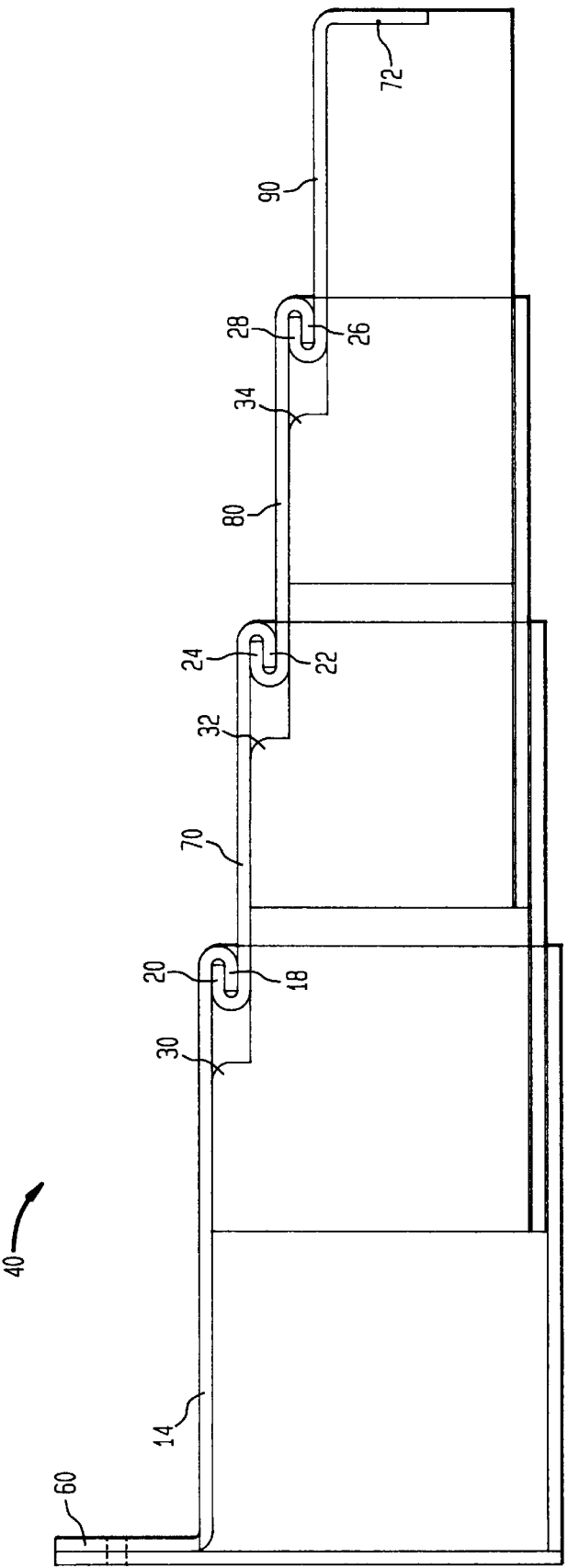

RETRACTABLE WEATHER SHIELD

FIELD OF THE INVENTION

This invention relates to a weather shield for use with an outdoor junction box containing electrical components, and in particular, to a retractable weather shield for use with an outdoor building entrance protector.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

In a telephone network, a network cable from the central office is connected to a building entrance protector (BEP) located at the customer site, where the individual telephone lines are broken out line by line. The network cable, which consists of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc. The customer telephone equipment is coupled through the connector block to a central office (CO) telephone line. The CO line side of the connector is generally the bottom side of the connector block, where the CO line tip-ring wire pairs are connected using a wire-wrapping tool.

The BEP may, of necessity be located outdoors. The BEP is generally located at eye level for the convenience of the technicians who service such equipment. The BEP has a lockable outer door to protect the electrical components from the weather and for security and other reasons. Frequently, it is necessary to open the BEP for servicing or maintenance. Such servicing will at times occur during inclement weather, such as rain, snow, or sleet. When the BEP is opened for servicing during such weather, the electrical components are exposed to the inclement weather, which could cause electrical short circuits, pose electrical shock hazards for the technician, or otherwise damage the electrical components. A shield is needed to prevent the inclement weather (elements) from contacting the electrical components. A shield is also needed to protect the technician from the elements, which can also include protecting the technician from the harmful rays of the sun. A large, fixed weather shield is not a viable option because it would be unsightly and be hazardous to passersby as most BEP's are located at about eye level. Also, a fixed rain shield would have to be constructed to resist the constant effects of wind, the weight of snow, or accidental collision. Accordingly, a retractable weather shield that can be easily and quickly deployed is desired.

SUMMARY OF THE INVENTION

The present invention provides a retractable weather shield. The weather shield can be easily and quickly deployed by the technician servicing the BEP.

The retractable weather shield of the present invention consists of a single base panel and one or more slide-type telescoping panels mounted within the base panel, the base panel being mountable above the BEP. The shield can be constructed of metal or plastic or any other suitable material having the necessary rigidity and weather resistant characteristics to meet the functions and operational parameters set forth herein.

The base panel is the largest panel, each successive telescoping panel being progressively smaller for successive nesting. The panels have mutually opposing hooks that allow each panel to engage and interlock with the next larger panel upon deployment of the shield. Upon full deployment, the mutually opposing interlocking hooks also prevent water from flowing backward towards the BEP. Each telescoping panel has a stabilizing portion rearward of the interlocking hook which maintains contact with the underside of the top of the next larger panel. The stabilizing portions help provide a more stable structure when the weather shield is deployed. The stabilizing portions can also be constructed so as to provide a downward tilt to the shield upon deployment to aid in channeling rain away from the BEP.

The innermost panel, which is the smallest panel, has a front wall which acts as a built in handle to aid in deployment. To deploy the shield, a technician or other user pulls the handle on the innermost panel. As the smallest panel deploys to its fullest extent, a hook at the rear portion of smallest panel engages an opposing hook on the front end of next larger panel, causing that panel to also be pulled out. Each successive panel is equipped in similar fashion, causing successive deployment of the next largest panel as the pulling force continues. The technician can deploy each successive panel by merely continuing to pull until all panels are deployed, or the shield can be deployed only partially. The panels also have a similar engaging feature to facilitate closing, whereupon when the technician wishes to close the shield, the technician pushes the innermost shield back towards the BEP and the innermost shield engages the next larger shield and so on until the shield is fully retracted.

The retractable weather shield has a bracket or similar equipment for mounting the shield to a substrate at a suitable point over the BEP. The bracket can be constructed in such a way that upon deployment, the shield tilts downward somewhat to aid in guiding the accumulating rain, snow etc. away from the BEP. The mounting bracket could be a separate unit connected to the shield, or it could be formed integrally with the shield, for example, as part of the base panel, or the shield could be mounted to the substrate through a back edge of the shield.

The upper face of the base panel, and telescoping panels within, may be sloped or somewhat v-shaped, e.g., where the center is higher than the sides, to aid in guiding water towards the sides of the shield and away from the BEP. Accordingly, upon deployment, the electrical components in the BEP, and the technician working thereon, are protected from the elements.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views:

FIG. 8 is a side elevational cutaway view of a retractable weather shield in its open and fully extended position and constructed in accordance with a preferred embodiment of the present invention.

DETAILED DESCRIPTION OF THE PREFERRED EMBODIMENTS

Figure 1:
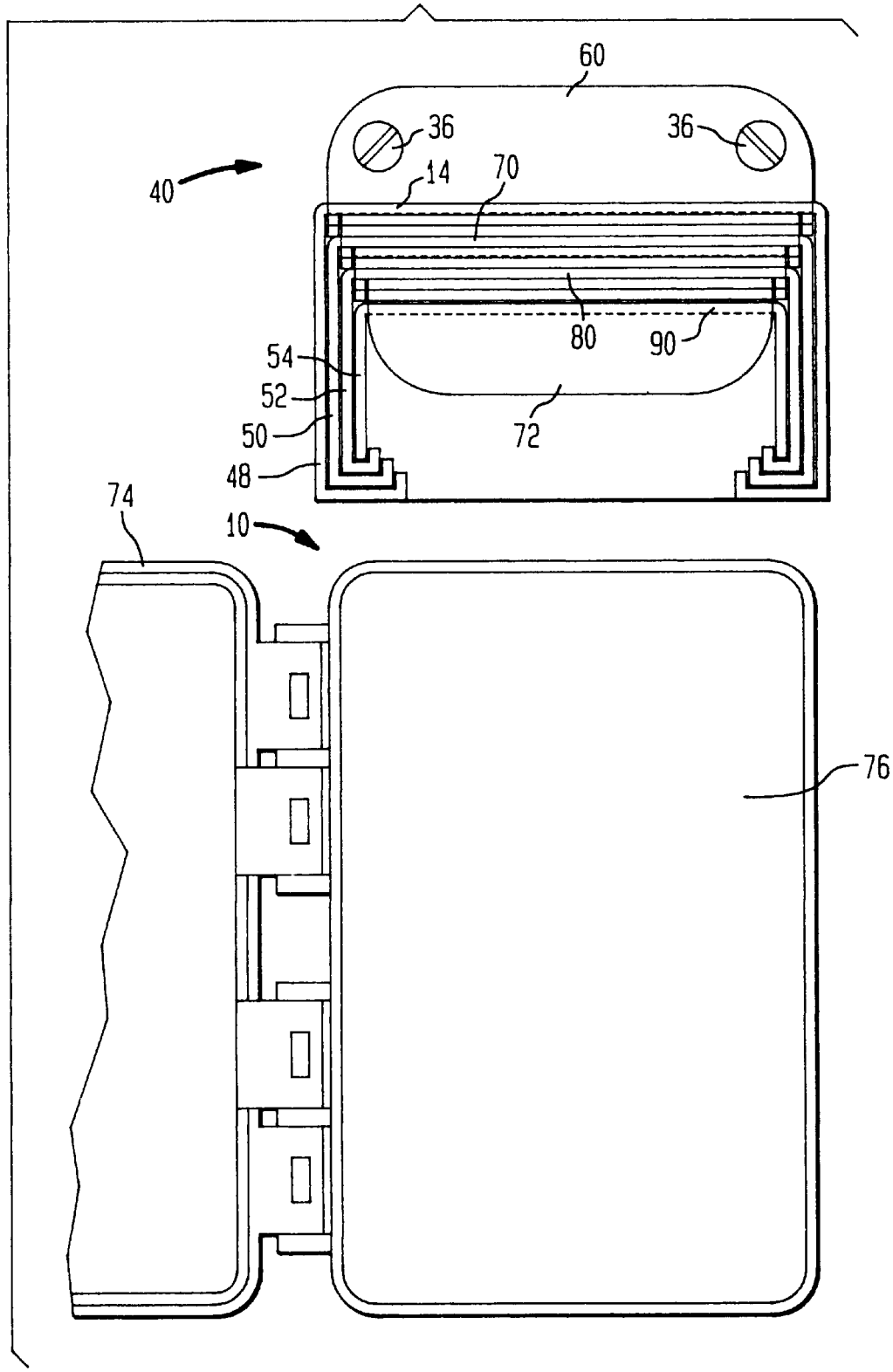
FIG. 1 is a front elevational view of a retractable weather shield constructed in accordance with a preferred embodiment of the present invention and mounted to a substrate (not shown) at a point above a BEP, with the outer door of the BEP open.
Figure 2:
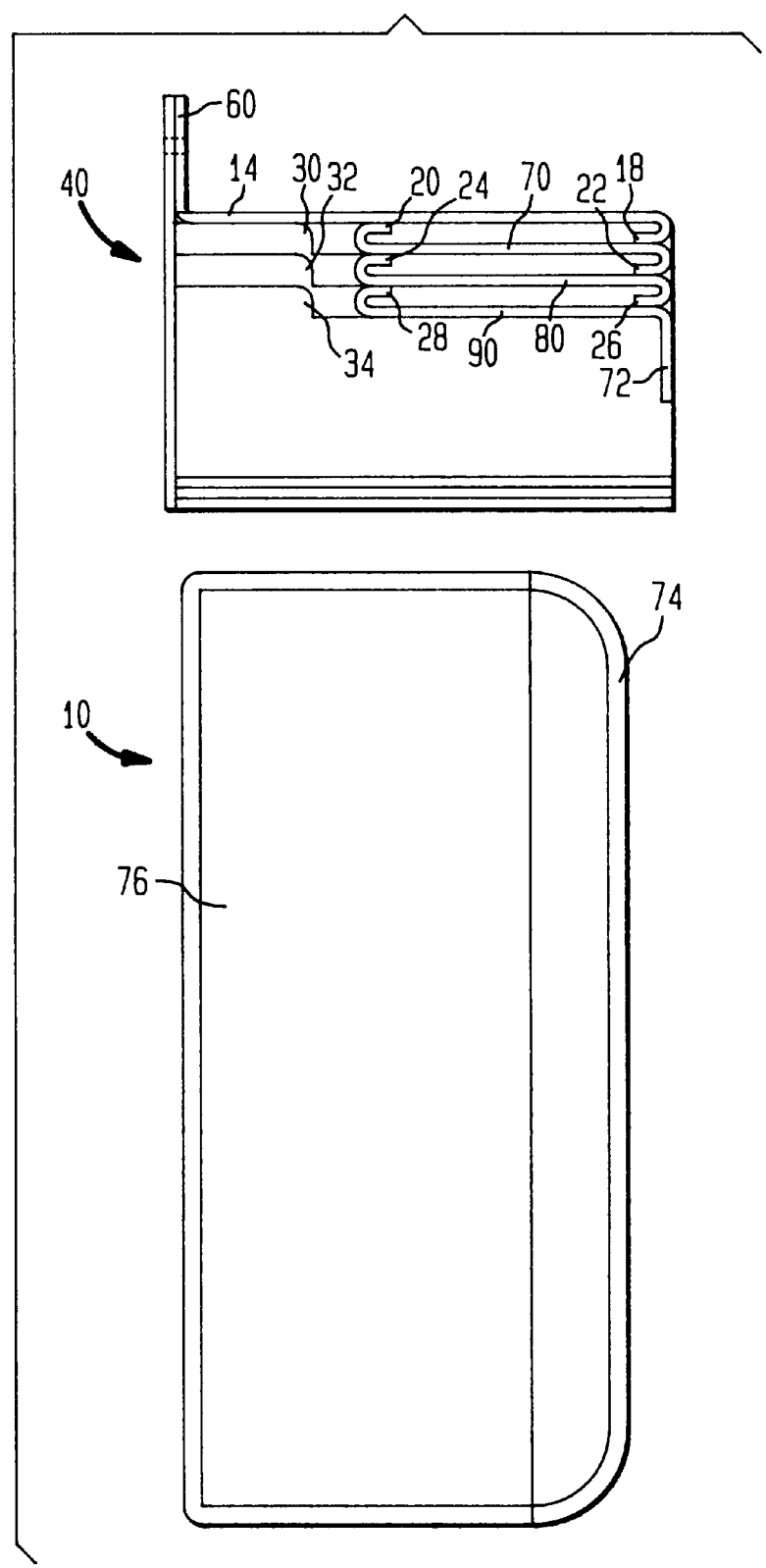
FIG. 2 is a side elevational view of a retractable weather shield mounted to a substrate (not shown) at a point above a BEP, with the outer door of the BEP closed, and constructed in accordance with a preferred embodiment of the present invention.
Figure 4A:
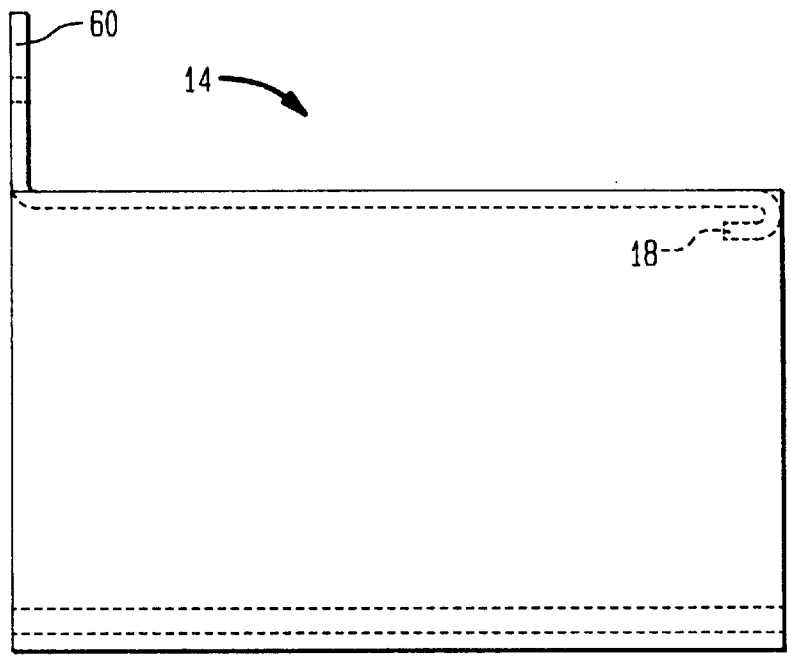
FIG. 4A is a side elevational view of the base panel of the retractable weather shield depicted in FIG. 3A.
Figure 4B:
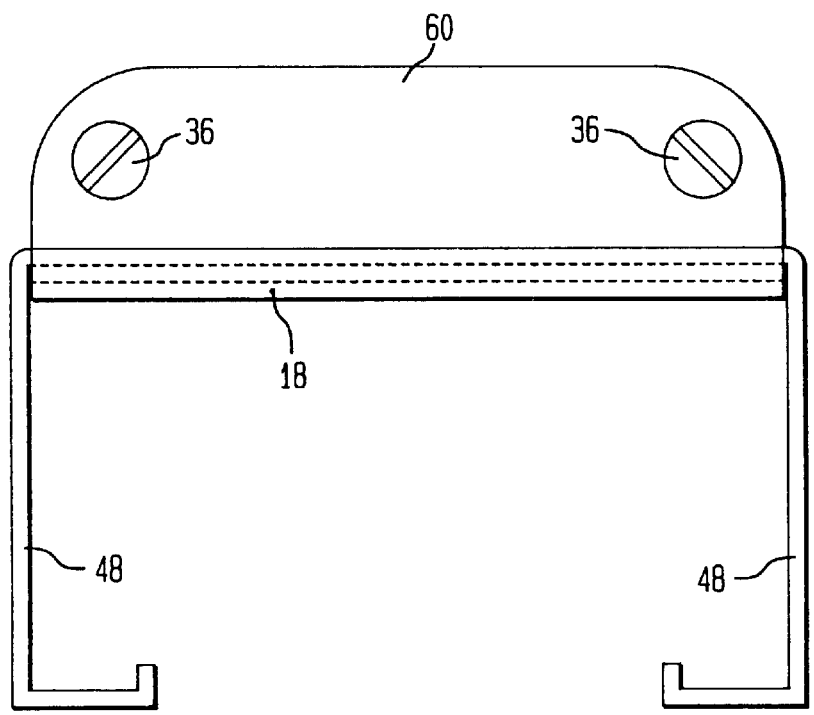
FIG. 4B is a front elevational view of the base panel of the retractable weather shield depicted in FIG. 3A.

FIG. 1 depicts a retractable weather shield according to a preferred embodiment of the present invention. The weather shield, generally depicted as 40, includes a base panel 14, mounted to a substrate (not shown) at a point above an outdoor structure containing electrical components, such as for example, a Building Entrance Protector (BEP) 10. Weather shield 40 is mounted to the substrate via mounting bracket 60. In a preferred embodiment, mounting bracket 60 is formed integrally with base panel 14 (FIG. 4B). Shield 40 may further comprise one or more telescoping panels which nest substantially within base panel 14. In a preferred embodiment, shield 40 comprises a base panel 14 and three telescoping panels 70, 80 and 90. Shield 40 is preferably constructed of metal or plastic or any other suitable material having the necessary rigidity and weather resistant characteristics to carry out the functions described herein, such as, by way of non-limiting example, thermoplastic, fiberglass, or sheet metal alloy. As seen in FIG. 2, when shield 40 is in a closed, fully retracted position, the shield overlies BEP 10 when outer door 74 of BEP 10 is closed. Shield 40 may be as wide as, or wider than, the enclosure over which it is mounted, as a matter of design choice.

Figure 3A:
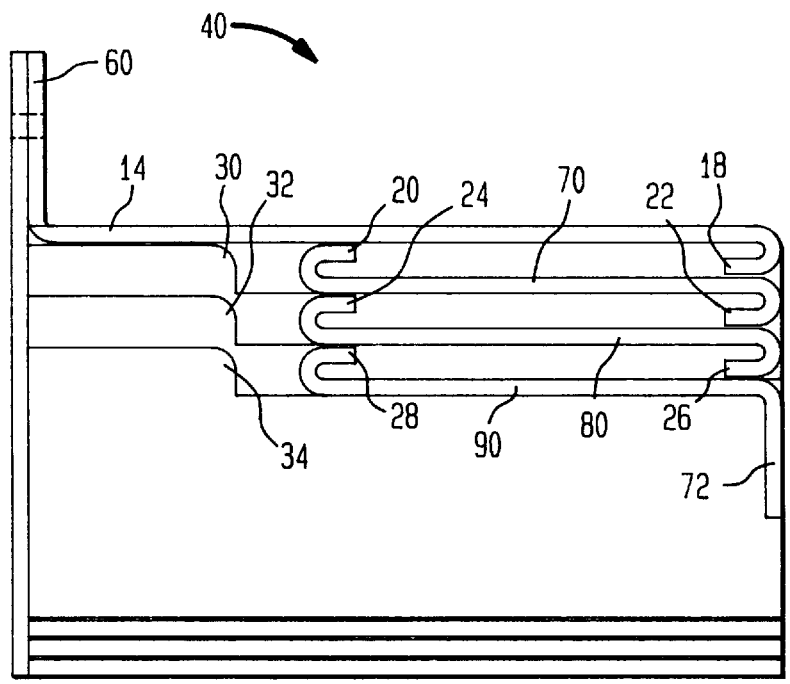
FIG. 3A is a side elevational cutaway view of a retractable weather shield constructed in accordance with a preferred embodiment of the present invention.
Figure 3B:
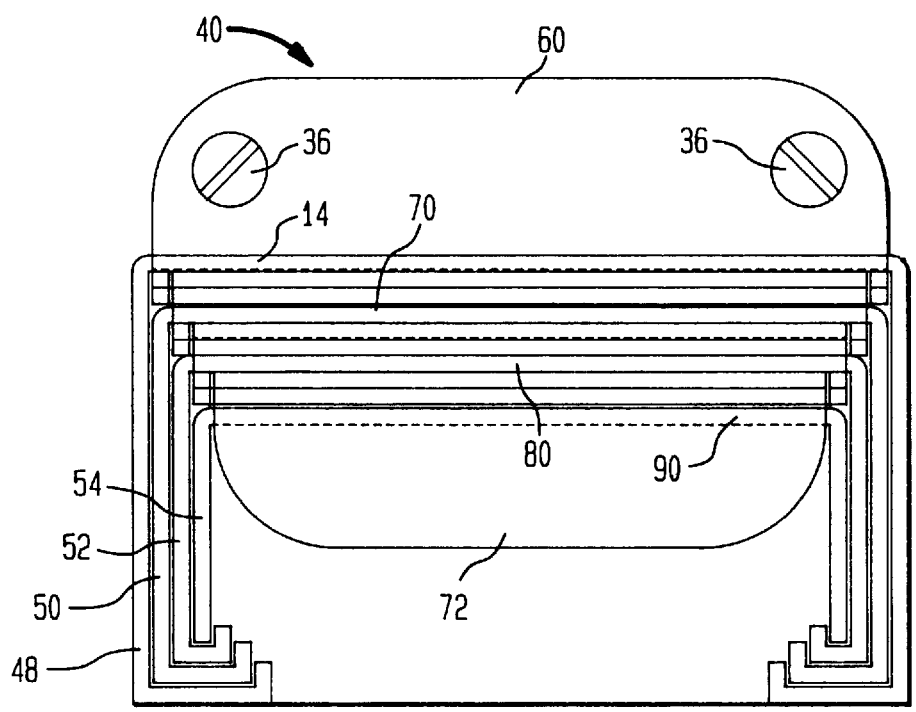
FIG. 3B is a front elevational view of the retractable weather shield depicted in FIG. 3A.

As best seen in FIGS. 3A and 3B, first telescoping panel 70 is slidably mounted and supported within base panel 14, second telescoping panel 80 is slidably mounted and supported within first telescoping panel 70, and third telescoping panel 90 is slidably mounted and supported within second telescoping panel 80. The side walls 48 of base panel 14 are generally U-shaped at their bottom edges to form a trough to support the underside of side walls 50 of first telescoping panel 70; side walls 50 of first telescoping panel 70 are generally U-shaped at their bottom edges to support the underside of side walls 52 of second telescoping panel 80; and side walls 52 of second telescoping panel 80 are generally U-shaped at their bottom edges to support the underside of side walls 54 of third telescoping panel 90. Other shapes of side walls are also contemplated within the scope of the invention, provided that the slideable, telescoping nature of the panels relative to each other is maintained. The person of skill will also recognize that any number of telescoping panels may be provided without departing from the spirit of the invention. The three telescoping panels are described herein are set forth as a non-limiting example, the actual number of telescoping panels, as well as their application specific size, is a matter of design choice, depending on how large a deployed shield is desired.

The innermost panel, which is the smallest panel, preferably has a downwardly extending front wall which acts as a built-in handle to aid in deployment of shield 40, although other known handle structures may also be utilized, either as an integral part of the innermost panel, or as an attachment thereto. In order to deploy the shield, the technician or other user pulls outward on handle 72. Third telescoping panel 90 then slides out of second telescoping panel 80. As third telescoping panel 90 reaches its fullest extension, interlocking hook 28 engages a mutually opposed interlocking hook 26 on second telescoping panel 80, causing second telescoping panel 80 to begin sliding out of first telescoping panel 70. As second telescoping panel 80 reaches its fullest extension, interlocking hook 24 engages a mutually opposed interlocking hook 22 on first telescoping panel 70, causing first telescoping panel 70 to begin sliding out of base panel 14. As first telescoping panel 70 reaches its fullest extension, interlocking hook 20 engages a mutually opposed interlocking hook 18 on base panel 14, whereupon shield 40 is fully deployed. That is, in its fully deployed position, third telescoping panel 90 is substantially outside of second telescoping panel 80, which is substantially outside of first telescoping panel 70, which is substantially outside of base panel 14. The person of skill will recognize from the teachings herein that the hooks need not extend along the entire width of the panels as shown, although it is preferable as further described below, it being necessary only that the hooks be sufficiently sized to permit engagement during deployment to permit full extension of the shield. Moreover, the means by which the panels engage during deployment need not be hooks, but may be other opposing members, such as, for example, flat tabs, dimples which mate with recesses, clips, or the like.

Figure 5A:
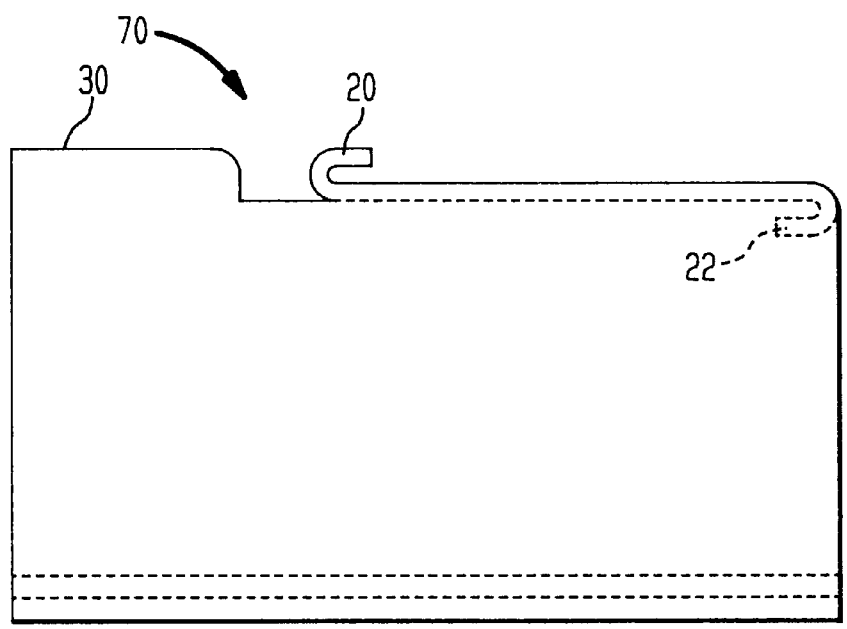
FIG. 5A is a side elevational view of the first telescoping panel of the retractable weather shield depicted in FIG. 3A.
Figure 5B:
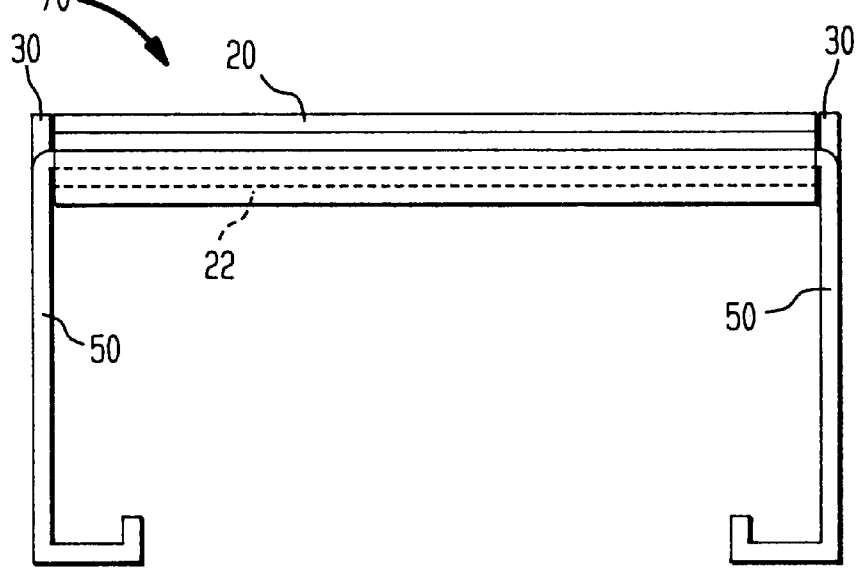
FIG. 5B is a front elevational view of the first telescoping panel of the retractable weather shield depicted in FIG. 3A.
Figure 6A:
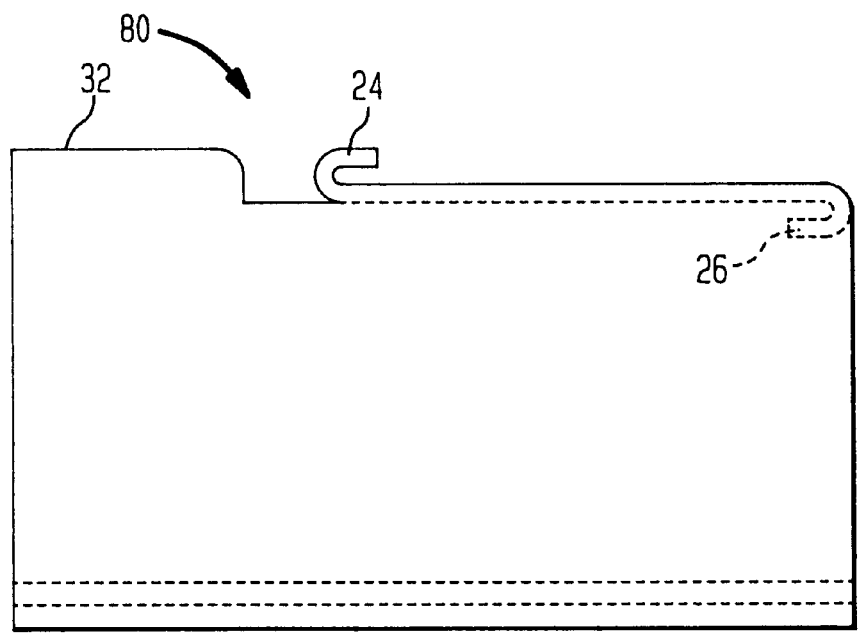
FIG. 6A is a side elevational view of the second telescoping panel of the retractable weather shield depicted in FIG. 3A.
Figure 6B:
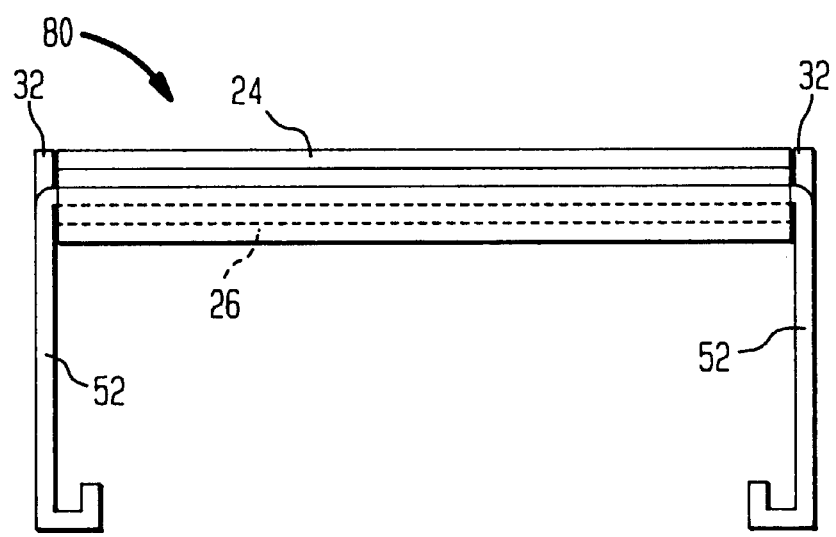
FIG. 6B is a front elevational view of the second telescoping panel of the retractable weather shield depicted in FIG. 3A.
Figure 7A:
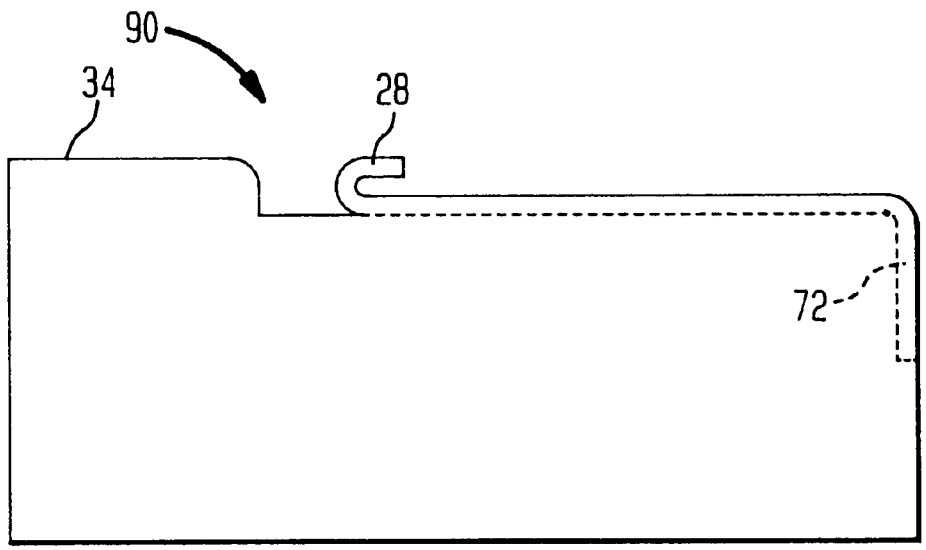
FIG. 7A is a side elevational view of the third telescoping panel of the retractable weather shield depicted in FIG. 3A.
Figure 7B:
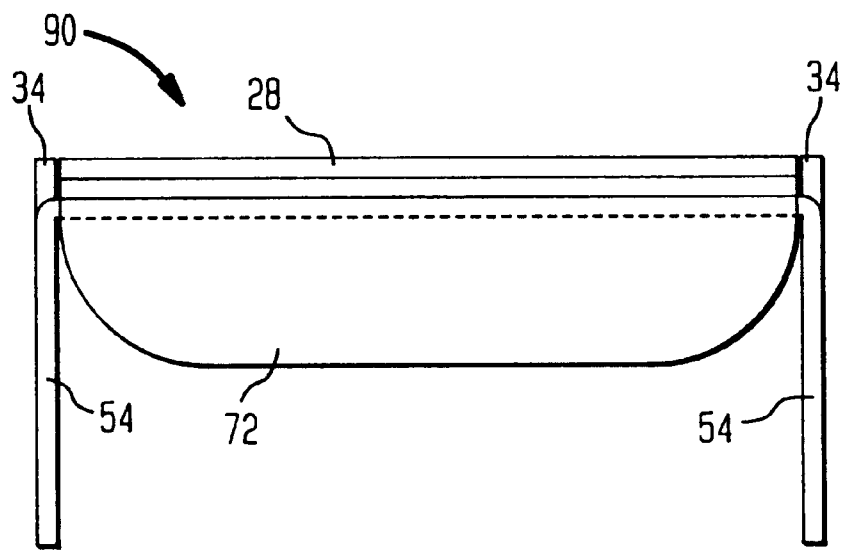
FIG. 7B is a front elevational view of the third telescoping panel of the retractable weather shield depict in FIG. 3A.

As best seen in FIGS. 4–8, base panel 14 has an interlocking hook 18 extending substantially along its width (FIG. 4A) and first telescoping panel 70 has a first mutually opposed interlocking hook 20 (FIG. 5A). When first telescoping panel 70 is fully extended, the mutually opposing hooks 18 and 20 engage one another, providing a water resistant seal (FIG. 8), that is, water is inhibited from flowing backwards from the first telescoping panel 70 to the base panel 14 towards BEP 10. Each telescoping panel preferably has similar interlocking hook features. That is, first telescoping panel 70 has a second interlocking hook 22 (FIG. 5A) and second telescoping panel 80 has a mutually opposed first interlocking hook 24 (FIG. 6A). Similarly, second telescoping panel 80 has a second interlocking hook 26 (FIG. 6A) and third telescoping panel 90 has a mutually opposed interlocking hook 28 (FIG. 7A). When third telescoping panel 90 is fully extended, the mutually opposing hooks 22 and 24, and 26 and 28, engage one another, also providing a water resistant seal (FIG. 8).

Also, as seen in FIGS. 3–8, each telescoping panel preferably has a stabilizing portion which maintains sliding contact with the underside of the top surface of the next larger panel. That is, first telescoping panel 70 has a stabilizing portion 30 (FIG. 5A) which maintains sliding contact with the underside of the top surface of base panel 14 (FIG. 8); second telescoping panel 80 has a stabilizing portion 32 (FIG. 6A) which maintains sliding contact with the underside of the top surface of first telescoping panel 70 (FIG. 8); and third telescoping panel 90 has a stabilizing portion 34 (FIG. 7A) which maintains sliding contact with the underside of the top surface of second telescoping panel 80 (FIG. 8).

The stabilizing portions help provide for a more stable structure during deployment of the telescoping panels and when shield 40 is fully deployed. Specifically, because the stabilizing portions maintain sliding contact with the underside of the top surface of the next larger panel, the stabilizing portions help prevent the telescoping panels from tilting downward too far as the telescoping panels are deployed. Stabilizing portions could be shaved down somewhat, however, as a matter of design choice, to provide a downward angled tilt to the telescoping panels, such that the telescoping panels are not parallel to each other and/or base panel 14 when open, so as to facilitate liquid drainage away from BEP 10. In any event, when shield 40 is deployed, it preferably extends substantially perpendicular to the surface upon which BEP 10 is supported. Also, the upper face of the base panel, and telescoping panels within, may be sloped or somewhat v-shaped, e.g., where the center is higher than the sides, to further aid in guiding water towards the sides of the shield and away from the BEP, (not shown). Accordingly, when shield 40 is deployed, the BEP interior 76 is protected from the elements, and the technician is protected from either the elements or the harmful rays of the sun, depending on the weather.

In a preferred embodiment, as seen in FIG. 3B, a mounting bracket 60 is provided integral with base panel 14, as a means for mounting shield 40 at a point above BEP 10 via mounting bolts 36. While mounting bracket 60 is depicted as extending vertically above base panel 14, one skilled in the art will recognize that mounting bracket 60 could be constructed in any number of ways without departing from the spirit of the invention. For example, mounting bracket 60 could be constructed on the underside of base panel 14 wherein mounting bracket 60 is effectively unseen by the passersby. Moreover, the exact means by which the shield 40 is secured to a support surface in a suitable position over the structure to be protected is variable, depending on application specific design needs, and may be accomplished by, for example, screwing, nailing, gluing, press-fitting, friction fitting, or other art-recognized fastening technique or combination thereof. The shield 40 could also be connected to an upper surface of the structure being protected, using any one or a combination of the securement methods mentioned above.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A retractable weather shield for protecting an outdoor structure mounted on a support surface from the elements, comprising:
    a base panel having a top surface, and two side surfaces having bottom edges forming a guide and support surface at each edge thereof;
    a first telescoping panel having a top surface, and two side surfaces having bottom edges, said bottom edges of said telescoping panel being slidably mounted and supported on said base panel bottom edges, said first telescoping panel being stored substantially within said base panel when in a stored position and extending substantially outside said base panel when in a deployed position; and
    mounting means connected to said base panel for mounting said shield above said structure, said base panel and said telescoping panel being so shaped and sized that said shield extends over said structure in a substantially perpendicular direction from said support surface when said first telescoping panel is in said deployed position, so as to protect said structure from the elements.

2. The weather shield according to claim 1, wherein said structure is a Building Entrance Protector.

3. The weather shield according to claim 1, wherein said shield, when said first telescoping panel is deployed, has an upper surface that is not flat.

4. The weather shield according to claim 1, further comprising a second telescoping panel slidably mounted and supported within said first telescoping panel, said second telescoping panel being stored substantially within said first telescoping panel when in a stored position and extending substantially outside said first telescoping panel when in a deployed position.

5. The weather shield according to claim 1, wherein said base panel and said first telescoping panel each have a mutually opposing inter-engageable hooks that engage during movement of said first telescoping panel into said deployed position.

6. The weather shield according to claim 5, wherein said base panel inter-engageable hook engages said first telescoping panel inter-engageable hook when said first telescoping panel is in said deployed position.

7. The weather shield according to claim 6, wherein said engagement of said hooks inhibits a flow of water from an upper surface of said shield toward said structure.

8. The weather shield according to claim 7, wherein said first telescoping panel has a stabilizing portion which contacts an inner surface of said base panel when in said deployed position.

9. The weather shield according to claim 8, wherein said stabilizing portion is constructed such that said first telescoping panel is angled when in said deployed position so as to inhibit a flow of water from an upper surface of said shield toward said structure.

10. The weather shield according to claim 9, wherein said first telescoping panel has a handle to aid in moving said first telescoping panel from said stored position to said deployed position.

11. The weather shield according to claim 4, wherein said first telescoping panel and said second telescoping panel each have a mutually opposing inter-engageable hook that engage during movement of said second telescoping panel into said deployed position.

12. The weather shield according to claim 11, wherein said first telescoping panel inter-engageable hook engages said second telescoping panel inter-engageable hook when said second telescoping panel is in said deployed position.

13. The weather shield according to claim 12, wherein said engagement of said hooks inhibits a flow of water from an upper surface of said shield toward said structure.

14. The weather shield according to claim 13, wherein said second telescoping panel has a stabilizing portion which contacts an inner surface of said first telescoping panel when said second telescoping panel in said deployed position.

15. The weather shield according to claim 14, wherein said stabilizing portion is constructed such that said second telescoping panel is angled when in said deployed position so as to inhibit a flow of water from an upper surface of said shield toward said structure.

16. The weather shield according to claim 14, wherein said second telescoping panel has a handle to aid in moving said second telescoping panel from said stored position to said deployed position.

17. The weather shield according to claim 16, wherein said mounting means comprises a bracket integral with and extending above said base panel.

18. The weather shield according to claim 16, wherein said mounting means comprises a bracket integral with and below a top surface of said base panel.

19. The weather shield according to claim 17, wherein said mounting means is constructed such that said base panel does not extend substantially perpendicular from said support surface.

20. A method of using a retractable weather shield for protecting the interior of an outdoor structure from the elements comprising the step of:
(a) moving a first telescoping panel, slidably mounted and supported on a bottom edge of a side surface of a base panel, from a stored position, wherein said first telescoping panel is substantially within said base panel, to a deployed position, wherein said telescoping panel extends over said structure in a substantially perpendicular direction so as to protect said structure from the elements.

21. The method of protecting the interior of an outdoor structure from the elements as claimed in claim 20, further comprising the step of;
(b) sliding out a second telescoping panel slidably mounted and supported within said first telescoping panel.

22. A Building Entrance Protector comprising:
a door;
an interior space covered by said door when said door is closed;
a base panel having a top surface, and two side surfaces having bottom edges forming a guide and support surface at each edge thereof;
a first telescoping panel having a top surface, and two side surfaces having bottom edges, said bottom edges of said telescoping panel being slidably mounted and supported on said base panel bottom edges, said first telescoping panel being stored substantially within said base panel when in a stored position and extending substantially outside said base panel when in a deployed position; and
mounting means for mounting said base panel above said Building Entrance Protector so that said shield extends over said Building Entrance Protector when said first telescoping panel is in said deployed position so as to protect said interior from the elements when said door is open.

23. A retractable weather shield comprising:
a base panel having a top surface, two side surfaces having bottom edges, a width dimension and a height dimension;
a first telescoping panel having a top surface, a bottom surface, two side surfaces, a width dimension and a height dimension,
said first telescoping panel width dimension being smaller than said base panel width dimension and said first telescoping panel height dimension being smaller than said base panel height dimension;
said bottom edges of side surfaces of said base panel being constructed so as to form a guide and support channel; and
said bottom surface of said first telescoping panel slidingly contacting said guide and support channel, wherein said first telescoping panel nests substantially within said base panel in a stored position and extends substantially outside said base panel when in a deployed position.

24. The weather shield according to claim 23, wherein said base panel is not flat.

25. The weather shield according to claim 23, further comprising a second telescoping panel slidably mounted and supported within said first telescoping panel, said second telescoping panel being stored substantially within said first telescoping panel when in a stored position and extending substantially outside said first telescoping panel when in a deployed position.

26. The weather shield according to claim 23, wherein said base panel and said first telescoping panel have mutually opposing inter-engageable hooks.

27. The weather shield according to claim 26, wherein said base panel inter-engageable hook engages said first telescoping panel inter-engageable hook when said first telescoping panel is in said deployed position.

28. The weather shield according to claim 27, wherein said inter-engageable hooks prevent water from flowing from a top surface of said first telescoping panel to an inside surface of said base panel.

29. The weather shield according to claim 28, wherein said first telescoping panel has a stabilizing portion which contacts a top inner surface of said base panel when in said deployed position.

30. The weather shield according to claim 29, wherein said stabilizing portion is constructed such that said first telescoping panel is not parallel to said base panel when in said deployed position.

31. The weather shield according to claim 28, wherein said first telescoping panel has a handle to aid in moving said first telescoping panel from said stored position to said deployed position.

32. The weather shield according to claim 25, wherein said first telescoping panel and said second telescoping panel have mutually opposing inter-engageable hooks.

33. The weather shield according to claim 32, wherein said first telescoping panel inter-engageable hook engages said second telescoping panel inter-engageable hook when said second telescoping panel is in said deployed position.

34. The weather shield according to claim 33, wherein said inter-engageable hooks prevent water from flowing from a top surface of said second telescoping panel to an inside surface of said first telescoping panel.

35. The weather shield according to claim 34, wherein said second telescoping panel has a stabilizing portion which contacts a top inner surface of said first telescoping panel when said second telescoping panel in said deployed position.

36. The weather shield according to claim 35, wherein said stabilizing portion is constructed such that said second telescoping panel is not parallel to said first telescoping panel when said second telescoping panel in said deployed position.

37. The weather shield according to claim 36, further comprising a mounting means for mounting said shield to a mounting surface.

* * * * *